Nov. 19, 1963  F. H. ZUCK  3,111,455
SUCTION ROLL SHELL AND METHOD OF MAKING SAME
Filed May 29, 1961
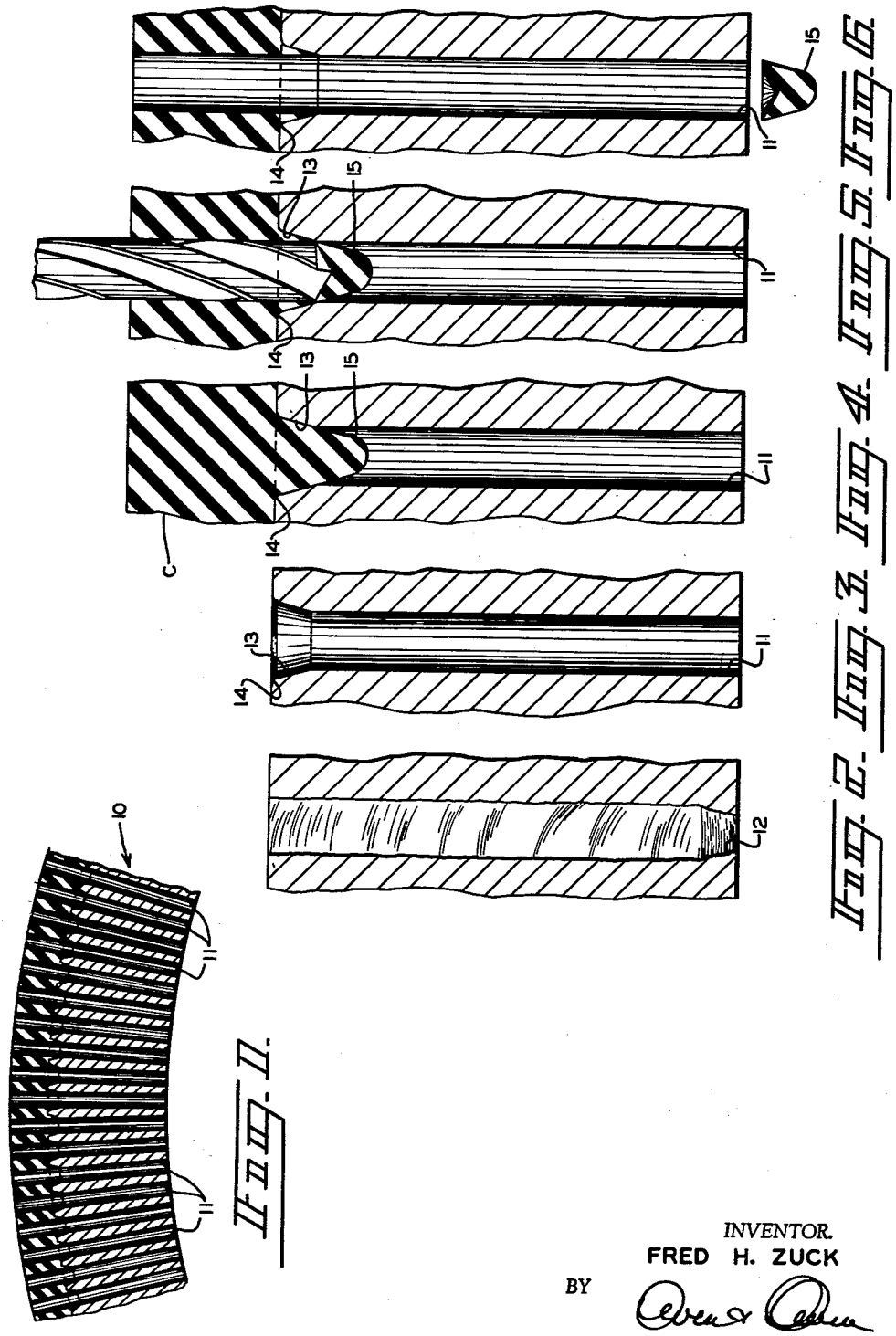
INVENTOR.
FRED H. ZUCK
BY
ATTORNEYS 3,111,455
SUCTION ROLL SHELL AND METHOD
OF MAKING SAME
Fred H. Zuck, Sandusky, Ohio, assignor to Sandusky Foundry & Machine Company, Sandusky, Ohio, a corporation of Ohio
Filed May 29, 1961, Ser. No. 113,428
8 Claims. (Cl. 162—372)

This invention relates to roll shells for paper making machines and is particularly directed to an improved method of preparing a shell for covering and to means to associate a resilient covering with the metallic body of a roll shell.

In the present practice of manufacturing roll shells for paper making machines, a tubular metallic body is formed and is subsequently drilled with a great multiplicity of perforations. The perforations are, in at least one known type of roll shell, spaced on .30 inch centers and comprise holes of 5/32 inch diameter. The drilled roll shell is then given a rubber or other resilient covering which is adhered to the surface of the roll shell by any of several bonding methods. Subsequently, the rubber covering is drilled to provide holes substantially coaxial with the holes in the roll shell and usually of slightly smaller diameter. Drilling the resilient material with a drill of the same size as the drill used in the shell itself will result in somewhat smaller holes due to the characteristics of the cover.

Since roll shells have as many as half a million holes to be drilled, the covering and redrilling is a time consuming and expensive operation. Further, each time a drill enters the cover there is a chance of so damaging the cover or shell as to make it virtually useless for its intended purpose. Thus it is higly desirable to provide some means to so relate the rubber covering to the metal shell that the service life is improved, and recovering and redrilling become necessary only at much longer intervals.

After a rubber covering has been applied to the previously drilled shell, it will be found that a portion of the rubber has been forced into each of the holes in the form of a small residual plug. The plug is only partially bonded to the wall of the hole because the bonding process requires the application of pressure during vulcanization of the rubber and there is little lateral pressure on the plug to cause its adhesion to the metal wall at this point. When the cover is drilled, the end of the tool usually enters the hole in the metal shell only a short distance, for example 1/32 to 1/16 inch. This is expected to be sufficient to break the residual plug loose from the body of the rubber cover so that it may be pushed on through the hole by a series of simple punches in a subsequent cleaning operation. If all of the previous operations of drilling the shell, covering it with rubber or similar resilient material, and drilling the cover have been perfectly conducted, the cleaning may be accomplished in a relatively short time.

However, in many instances the residual plugs cannot be punched out by the conventional machine and must be removed either by a single manually held punch inserted into each individual hole or must be drilled out. Manual cleaning and close inspection may consume as much as 1100 man hours. If drilling must be resorted to, it is sometimes found that the drill, instead of removing the plug, drills a hole through it leaving a thin sleeve of rubber within the hole. These rubber sleeves must then be removed manually. Here again several hundred man hours of tedious labor are involved.

I have discovered that cleaning time can be reduced and the operation made completely reliable if the sides of the hole are smooth and parallel in the areas of nominally uniform diameter. The normal, and heretofore universally accepted practice has been found to leave a drilled hole in which the walls are not smooth, but are covered with tool marks, and are not parallel, but converge at the portion of the hole adjacent the inside diameter of the shell. This convergence usually takes the form of one or a series of step-like projections which increasingly restrict the hole diameter. It is upon these projections that the residual plugs lodge and which make cleaning difficult. In service these same projections cause the accumulation of fibers sucked away from the paper web. The accumulated fibers are periodically removed by flushing the roll with clean water, but if this is delayed or if for any other reason fibers accumulate in some of the holes, the suction through the partially plugged holes is reduced and the condition worsens to the point where all holes in a part of the shell are plugged up. The machine must then be shut down, the roll removed and cleaned out (usually by hand) and replaced. When certain alloys, such as stainless steels, which depend upon oxidizing environment for corrosion resistance contain holes plugged with fiber, conditions exist which permit corrosion of the metal at an accelerated rate.

The present invention has for one of its principal objects to overcome the above described disadvantages by re-machining the drilled holes, prior to covering the shell, to assure that the walls of each hole are smooth and parallel.

The present invention also comprehends means to increase the service life of a suction roll shell made as described above. The service life is at present limited primarily by wearing or destruction of the rubber covering and normal wear will result in a roll having a service life of many years. Premature destruction of the cover may occur at any time. Failure of the roll shell itself should be expected only after a much longer period.

It sometimes happens that in drilling the rubber covering, a minor tearing away of the rubber from the metal occurs by reason of the drill striking the metal surface of the shell at some distance from the side of the hole instead of entering the previously drilled hole. It has been found that this damage gives rise to minute areas where the bond has been destroyed and which subsequently form foci from which deterioration of the bond begins and corrosion of the roll surface starts. The deterioration and corrosion continue until a great area of the rubber is no longer adhered to the metal so that the cover can shift peripherally or axially with respect to the roll shell to such an extent that the registry between the holes in the rubber and the holes in the metal is either destroyed or so impaired that a significant variation in suction occurs in the affected area. This variation in suction causes the paper web to be imperfect in spots or lines. The shell is then no longer fit for service and must be re-built by stripping it of its covering, recovering and redrilling.

As previously noted, recovering and redrilling is a time consuming and expensive operation and anything that will significantly increase the service life of the roll to eliminate these operations is highly advantageous. The present invention includes the provision of means to machine the inside of the holes in the roll shell to a configuration which will significantly increase the area of bonding and thus greatly prolong the life of the roll, without weakening the shell in any way. Further, by the present invention the increase in bonding area is obtained at such a location that minute destruction of the bond caused by imperfect alignment of the rubber drilling tool with the previously drilled hole will not seriously damage the covering and give rise to areas at which corrosion and cover loosening begin.

It is therefore another object of the invention to improve the adhesion between a resilient roll covering and the metallic shell portion thereof.

It has heretofore been proposed to attempt a mechanical anchorage of a cover to a roll shell by providing elements structurally integral with the cover and received in spaced, specially countersunk holes in the shell. Such attempts have not been commercially acceptable because they did not increase the bonding area and did not eliminate the sharp corners of the metal which seem always to be the points at which the bond gives away first. The present invention not only increases the bonding area, but, by providing a merging radius between the shell surface and the inwardly directed new bonding areas, eliminates the sharp corners normally formed.

While the present invention may be advantageously used with copper-base alloy shells it is of particular value when used with steel alloy shells of the most modern type. These shells may run as much as 50 inches in diameter, with a 2½ inch wall thickness and a length up to 350 inches. The shells, in service, are run at extremely high peripheral speeds, sometimes in excess of 3000 feet per minute and are subject to very high pressures applied in a radially inward direction. The high speeds, high pressures and corrosive environment in which the shells must operate all combine to create a corrosion fatigue problem of great severity. By eliminating points of stress concentration at the surface of and within the body of the shell, the present invention contributes a valuable solutuion to the problem of failure by corrosion fatigue. Stress concentration points occur at sharp corners, scratches, gouge marks and other surface discontinuities and are thus found in the shells of the type now known at the surface and within the drilled holes.

Other objects and advantages of the invention will become apparent from the following detailed description of a preferred embodiment thereof, reference being had to the accompanying drawings, in which:

FIGURE 1 is a fragmentary transverse sectional view through a suction roll shell constructed in accordance with the present invention;

FIG. 2 is a detail sectional view showing a drilled hole in the metallic portion of a roll shell prior to remachining.

FIG. 3 is a detail sectional view showing a remachined hole formed in accordance with the preferred embodiment of the invention;

FIG. 4 is a detail sectional view showing the roll shell after the resilient cover has been applied thereto;

FIG. 5 is a detail sectional view illustrating the step of drilling the cover material; and FIG. 6 is a detail sectional view showing the form of the perforations in a completed roll shell and illustrating the removal of the residual plug of resilient cover material.

Briefly stated, the present invention comprehends the method of making a roll shell, and the roll shell, for a paper making machine comprising a tubular cylinder having perforations extending therethrough, each of the perforations having a cylindrical portion that is made smooth and parallel by a remachining operation, and each or some of the remachined perforations having a conical portion adjacent the outer diameter of the shell with the base of the cone adjacent the outer surface, the diameter of the base being somewhat greater than the diameter of the cylindrical portion of the perforation. A cover of rubber or other resilient compound is bonded to the outer surface of the cylinder and most importantly to the walls of the conical portions of the perforations. The cover has passages through it in registry and coaxial with the perforations in the shell so that conical protrusions are formed on the interior of the cover which extend into and are bonded to the walls of the conical portions of the perforations. In the preferred embodiment, there is a merging radius between the conical portion of the perforation and the outer surface of the shell to eliminate sharp corners at this point.

Referring in detail to the accompanying drawings, a roll shell embodying the invention comprises an elongated tubular metallic body 10 usually made by centrifugal casting in a sand-lined mold. After casting, the shell is machined on both its inside and outside diameters to very close tolerances and polished on the outside. Shells that are intended for use as suction rolls for paper making machines range in length up to 350 inches and in diameter up to 50 inches. Because of the deflection encountered in service, shells may be crowned or made of greater thickness in the center than on the ends. However, in service the roll shell constitutes a cylindrical body since the active surface is parallel to the axis of rotation of the roll.

After the roll shell is initially finished by boring the interior and cutting the exterior to the proper size and configuration on a lathe, it is taken to a drilling machine to be perforated with a series of holes 11 in a particular and definite pattern. The hole size, spacing and pattern are specified by the customer and are based on the necessity for a certain percentage of open area through which suction is applied to the moving web of paper, and the desirability of reducing the noise of operation, which depends to a large extent on the hole pattern.

The drilling machine comprises an elongated rail carrying a large number of spindles each of which is provided with an easily replaceable drill. The drills are put into rotation and advanced into the work and forced through it in steps. That is, if the roll shell is, for example, 2½ inches thick, the drills are advanced into and retracted several times to clear chips and as many as six or eight entries may be made. When the drills have finally penetrated to the inside diameter, the shell is indexed and another group of holes 11 is drilled by advancing the rail.

It has been found that the holes thus drilled are rough throughout their length by reason of the creation of tool marks and chip gouges, and that they are reduced in diameter or necked in where the drills break out into the interior of the shell, as indicated at 12 in FIG. 2. The roughness of the drilled holes, and their variation in diameter has been a major source of trouble which has not heretofore been appreciated. In accordance with the present invention, an additional machining step is introduced into the process of manufacturing roll shells, over the process as it has been practiced in the past.

The additional machining step is taken for the purpose of assuring that each hole 11 has parallel sides throughout, that there are no restrictions therein, and that the bores are smooth. This may be accomplished by a parallel sided reaming tool, by inserting and withdrawing a broach, or even by redrilling the hole with a drill that is only slightly larger than the original hole diameter.

In the preferred practice of the present invention, the re-machining of the holes is accompanied by a step of forming the portion of each hole (or the majority of the holes) adjacent the outside diameter of the roll shell with a portion of enlarged diameter 13. The enlarged diameter portion is preferably conical with the base of the cone of enlargement at the outside diameter of the shell and the apex of the cone on the axis of the hole 11. A tapered reamer may be used to form the conical portion or hole enlargement 13 although it is preferred to incorporate a shaped portion in the shank of the re-machining tool. The shaped portion also includes cutting edges to form a merging radius 14 in the most advantageous form of the invention (FIG. 3). By utilizing a merging radius 14 the sharp edge that is normally present at this point is eliminated. In the past, it has been common practice to countersink the outside of the holes in couch rolls for paper making machines, and occasionally the holes in press rolls have been countersunk where it was not intended that the shell be rubber covered. However, no countersinking has ever been done, so far as I am aware as a part of a re-machining of the entire hole to eliminate interior roughness and restrictions.

After the shell has been drilled and re-machined, it is covered with a layer of resilient material such as rubber or the like, designated C in the drawings. Various proprietary bonding processes are used for this purpose. The covering is usually from ½ to 1⅛ inches thick and the hardness of the resilient material from which it is made will be specified by the customer. The heat and pressure required properly to form and cure the cover and to bring about proper adhesion to the metal of the shell causes the cover material to enter partially into the holes 11 and to adhere firmly to the tapered enlargement portions 13. In addition some of the cover material enters into the cylindrical portions of the holes 11 in the form of residual plugs 15. The plugs 15 are only poorly adhered to the side walls of the holes (FIG. 4).

The drilling pattern on suction roll shells is, in many instances, so close that as much as 40 percent of the shell area is open and only 60 percent of the surface of the shell is available to receive and retain the coating bond. In the past it has been proposed to insert plugs in certain spaced countersunk holes prior to the bonding step of applying the cover so that the cover material will adhere to the plugs. While some assistance against peripheral shifting of the cover might have derived from such a construction, the area of the bonding would not have been increased because there was no adherence between the manually inserted plugs and the side walls of the holes in which they were received. Thus this proposal would not have strengthened the bond of the cover against radial displacement brought about by the high speed operation of the roll. Radial displacement, in modern machines, is an important factor because of the high speed of operation of these machines and the high centrifugal forces that develop from it tending to throw the rubber cover away from the metallic surface of the roll.

It has also been proposed, in the past, to improve the mechanical bond between the cover and the roll shell by machining a dovetail slot longitudinally of the shell and forcing the covering material into the slot during covering process. Such steps have proved inadequate for the reason that it is very difficult to remove entrapped air from the undercut slot and the bonding process, instead of being improved, is actually made less certain. Any attempt to bond into an undercut or even a completely cylindrical radial opening having substantially square lower corners may result in the entrapment of air beneath the covering material which expands when the roll is vulcanized or runs at a high temperature and has a pronounced tendency to interfere with the bond and to loosen the cover by the pressure exerted when the gas expands.

The present invention provides a vastly increased area of adhesion between the cover material and the roll shell since the cover material is firmly adhered, without the possibility of entrapping air, to the walls of the conical countersunk portion. In this manner, instead of being adhered to only 60 percent of the area of the exterior of the roll shell, the adherence may be over a surface at least equal to or greater than the original area of the roll shell prior to drilling.

The roll shell with the now continuous covering thereon is returned to the drilling machine and the cover is perforated at each of the previously formed holes in the metal shell with a drill which may be of substantially the same diameter as the drill used to form the initial hole in the metal (FIG. 5). Obviously it is intended that the perforations of the cover shall be precisely coaxial with the holes in the metal, but by reason of uncompensated variations in temperature and other conditions precise alignment does not always occur. If a drill is forced through the cover that is not in exact alignment with the hole in the metal it will strike the side of the tapered enlargement portion 13 and will then, by reason of its lengthwise flexibility be deflected and guided into the hole 11. The penetration of the drill is usually carried about $\frac{1}{32}$ inch beyond the intersection of the tapered enlargement portion 13 of the hole with the cylindrical portion thereof. This is usually sufficient to break the adhesion between the residual plug 15 and the remainder of the covering material and also to loosen the residual plug so that it may be easily cleaned out of the hole by punching it through to the inside diameter of the roll shell.

The practice of drilling, covering and drilling the adhered cover material as heretofore described is discussed in the patent to Berry 1,947,636 which issued February 20, 1934. As noted in said Berry patent, the residual plugs of rubber that partially fill the holes in the roll shell after covering cannot always be punched out of the holes and must be cleaned out later by hand. This condition obtains because of the interior roughness of the holes and the restrictions formed therein by the normal drilling operation. By the present invention, in which the holes in the shell are re-machined to provide completely smooth side walls and completely uniform diameters, such difficulty is overcome. Since, as previously noted, there may be as many as half a million holes in a roll shell, manual cleaning of each hole as contemplated by the Berry patent, and as practiced heretofore in the art, is avoided. The residual plugs are loosened and can be pushed easily through to the interior of the roll shell simply by blowing the plugs out with an air hose. This may reduce the cleaning time from as much as 1100 man hours to as little as 10 man hours, all as a result of the re-machining operation heretofore described.

While the present invention has been described in conjunction with a specific embodiment thereof, numerous changes may be made therein without departing from the scope of the appended claims.

What I claim is:

1. A roll shell for a paper making machine, comprising a tubular cylinder having perforations extending therethrough from the outer surface of said cylinder to the hollow interior thereof, each of said perforations having a cylindrical portion of substantially constant diameter and a conical portion with its base adjacent said outer surface, the diameter of said base being greater than the diameter of said cylindrical portion, a resilient body bonded to the outer surface of said cylinder, said body having passages therethrough in registry with said perforations, and conical protrusions formed on said body extending into and bonded to the walls of said conical portions of said perforations whereby said cover is anchored against slipping relative to said cylinder by the mechanical interconnection of said conical protrusions on said conical portions and against radial displacement by the bond to said conical portions of said perforations.

2. A roll shell for a paper making machine, comprising a tubular cylinder having perforations extending therethrough from the outer surface of said cylinder to the hollow interior thereof, a predetermined number of said perforations having a cylindrical portion of substantially constant diameter and a conical portion with its base adjacent said outer surface, the diameter of said base being greater than the diameter of said cylindrical portion, a resilient body bonded to the outer surface of said cylinder, said body having passages therethrough in registry with said perforations, and conical protrusions formed on said body extending into and bonded to the walls of said conical portions of said perforations whereby said cover is anchored against slipping relative to said cylinder by the mechanical interconnection of said conical protrusions on said conical portions and against radial displacement by the bond to said conical portions of said perforations.

3. A roll shell for a paper making machine, comprising a tubular metallic cylinder having perforations extending therethrough from the outer surface of said cylinder to the hollow interior thereof, each of said perforations having a major portion of substantially constant diameter and a conical portion with its base adjacent said outer surface, said base having a diameter greater than the diameter of said major portion and a curved surface at the intersection of said base and said outer surface, a resilient body bonded to said outer surface having passages therethrough in registry with said perforations, and conical protrusions formed on said body extending into and bonded to the walls of said conical portions whereby said cover is anchored against slipping relative to said cylinder by the mechanical interconnection of said conical protrusions on said conical portion and against radial displacement by the bond to said conical portion of said perforations.

4. A roll shell for a paper making machine, comprising a tubular metallic cylinder having perforations extending therethrough from the outer surface of said cylinder to the hollow interior thereof, a predetermined number of said perforations having a major portion of substantially constant diameter and a conical portion with its base adjacent said outer surface, said base having a diameter greater than the diameter of said major portion and a curved surface at the intersection of said base and said outer surface, a resilient body bonded to said outer surface having passages therethrough in registry with said perforations, and conical protrusions formed on said body extending into and bonded to the walls of said conical portions whereby said cover is anchored against slipping relative to said cylinder by the mechanical interconnection of said conical protrusions on said conical portion and against radial displacement by the bond to said conical portion of said perforations.

5. The method of manufacturing a suction roll shell for paper making machines which comprises, forming an elongated tubular metallic body, finishing the body on its inside and outside diameters, forming a great multiplicity of radial perforations in said body, re-machining said radial perforations to impart a smooth finish and continuous diameter to the walls thereof, countersinking said perforations adjacent the outside diameter at an acute angle to the axis of said smooth walls, establishing a merging radius between the tapered countersunk portions and the outside diameter of the body, bonding a resilient covering to the surface of said perforated roll shell and to the walls of said tapered countersunk portions, and perforating said cover with holes coaxial with the perforations in said metallic shell and of a diameter less than the larger diameter of said tapered countersunk portions.

6. The method of manufacturing a suction roll shell for paper making machines which comprises, casting an elongated tubular metal body, finishing the casting on its inside and outside diameters, forming a great multiplicity of radial perforations in said casting, countersinking said perforations adjacent the outside diameter at an acute angle to the axis of said perforations, establishing a merging radius between the countersunk portions and the outside diameter of the roll shell, bonding a resilient covering to the surface of said perforated roll shell and to the walls of said tapered countersunk portions, and perforating said covers with holes coaxial with the perforations in said metallic shell and of a diameter less than the larger diameter of said tapered countersunk portions, whereby the bond between said resilient covering and the tapered countersunk portions remains undisturbed.

7. The method of manufacturing a suction roll shell for paper making machines which comprises, forming an elongated tubular metallic body, finishing the body on its inside and outside diameters, forming a great multiplicity of radial perforations in said body, countersinking said perforations adjacent the outside diameter at an acute angle to the axis of said perforations, re-machining said perforations to impart a smooth finish and continuous diameter to the walls thereof, establishing a merging radius between the countersunk portions and the outside diameter of the roll shell, bonding a resilient covering to the surface of said perforated roll shell and to the walls of said conical countersunk portions, and perforating said covers with holes coaxial with the perforations in said metallic shell and of a diameter less than the larger diameter of said tapered countersunk portions.

8. The method of manufacturing a suction roll shell for paper making machines which comprises, casting an elongated tubular metal body, finishing the casting on its inside and outside diameters, drilling a great multiplicity of radial perforations in said casting, re-machining said radial perforations to impart a smooth finish and continuous diameter to the walls thereof, countersinking said perforations adjacent the outside diameter at an acute angle to the axis of said smooth walls, establishing a merging radius between the countersunk portions and the outside diameter of the roll shell, bonding a resilient covering to the surface of said perforated roll shell and to the walls of said tapered countersunk portions, and perforating said cover with holes coaxial with the perforations in said metallic shell and of a diameter less than the larger diameter of said tapered countersunk portion and of substantially the same diameter as the smooth constant diameter portions of said re-machined perforations.

References Cited in the file of this patent

UNITED STATES PATENTS

| | | |
|---|---|---|
| 1,854,053 | Millspaugh | Apr. 12, 1932 |
| 1,947,636 | Berry | Feb. 20, 1934 |
| 2,069,119 | Standley et al. | Jan. 26, 1937 |

FOREIGN PATENTS

| | | |
|---|---|---|
| 629,633 | Great Britain | Sept. 23, 1949 |
| 974,767 | France | Oct. 4, 1950 |
| 833,162 | Great Britain | Apr. 21, 1960 |